US011014515B2

(12) United States Patent
Möller et al.

(10) Patent No.: US 11,014,515 B2
(45) Date of Patent: May 25, 2021

(54) METHOD FOR CONFIGURING A VEHICLE

(71) Applicant: AUDI AG, Ingolstadt, DE (US)

(72) Inventors: Malte Möller, Mitterfeld (DE); Sebastian Osswald, Munich (DE); Stefanie Menzl, Munich (DE); Alex Krause, Munich (DE); Florian Höll, Munich (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 16/464,879

(22) PCT Filed: Nov. 29, 2017

(86) PCT No.: PCT/EP2017/080820
§ 371 (c)(1),
(2) Date: May 29, 2019

(87) PCT Pub. No.: WO2018/114257
PCT Pub. Date: Jun. 28, 2018

(65) Prior Publication Data
US 2019/0322231 A1  Oct. 24, 2019

(30) Foreign Application Priority Data
Dec. 21, 2016  (DE) .................... 10 2016 225 788.9

(51) Int. Cl.
*B60R 16/037* (2006.01)
*B60W 40/08* (2012.01)
*G07C 5/00* (2006.01)

(52) U.S. Cl.
CPC .......... *B60R 16/037* (2013.01); *B60W 40/08* (2013.01); *G07C 5/008* (2013.01); *B60W 2540/043* (2020.02)

(58) Field of Classification Search
CPC .......... B60R 16/037; B60W 2540/043; B60W 40/08; G07C 5/008
See application file for complete search history.

(56) References Cited

U.S. PATENT DOCUMENTS 6,263,268 B1 * 7/2001 Nathanson ............. G07C 5/008
340/870.01
7,685,162 B2 * 3/2010 Heider ................ H04L 63/0853
707/802

(Continued)

FOREIGN PATENT DOCUMENTS

DE  102013015737 A1  4/2014
DE  102012024010 A1  6/2014

(Continued)

OTHER PUBLICATIONS

International Search Report and Written Opinion of the International Searching Authority directed to related International Patent Application No. PCT/EP2017/080820, dated Mar. 13, 2018, with attached English-language translation; 21 pages.

(Continued)

*Primary Examiner* — Babar Sarwar
(74) *Attorney, Agent, or Firm* — Sterne, Kessler, Goldstein & Fox P.L.L.C.

(57) ABSTRACT

The invention relates to a method for configuring a vehicle, which is provided for a plurality of users. The method includes storing user data, where the user data are gathered in a user account, and available vehicle features of the vehicle in a storage unit. The method further includes defining vehicle groups based on the association of a respective user account to be assigned to the vehicle with a respective user group and defining a configuration by assigning respective availabilities of vehicle features of the vehicle to a user of a respective vehicle group. The method further includes storing the configuration in the storage unit. The (Continued)

invention also relates to a vehicle, which is designed to implement the method according to the invention.

13 Claims, 1 Drawing Sheet

(56) References Cited

U.S. PATENT DOCUMENTS

| | | | | |
|---|---|---|---|---|
| 8,712,681 B2* | 4/2014 | Huang | ................ | G06Q 50/30 |
| | | | | 701/408 |
| 8,737,913 B2* | 5/2014 | Xiao | ................ | G07C 5/008 |
| | | | | 455/41.1 |
| 9,238,450 B1* | 1/2016 | Kleve | ................ | B60R 25/241 |
| 9,294,459 B2 | 3/2016 | Baade et al. | | |
| 10,106,172 B2* | 10/2018 | Wingfield | ........... | G06Q 30/0645 |
| 2002/0152010 A1* | 10/2002 | Colmenarez | ......... | G06K 9/6293 |
| | | | | 701/36 |
| 2006/0253894 A1* | 11/2006 | Bookman | ............ | H04W 12/37 |
| | | | | 726/2 |
| 2007/0282496 A1* | 12/2007 | Morimoto | ............ | G06Q 50/10 |
| | | | | 701/31.4 |
| 2008/0097783 A1* | 4/2008 | Iannacci | ............ | G06Q 30/0281 |
| | | | | 705/346 |
| 2008/0198018 A1* | 8/2008 | Hartley | ............... | H04M 1/7246 |
| | | | | 340/572.4 |
| 2009/0096573 A1* | 4/2009 | Graessley | ............ | B60W 50/12 |
| | | | | 340/5.8 |
| 2012/0143404 A1* | 6/2012 | Zimmermann | ....... | H04L 41/082 |
| | | | | 701/2 |
| 2015/0045988 A1* | 2/2015 | Gusikhin | ........... | G07C 9/00571 |
| | | | | 701/2 |
| 2015/0066246 A1* | 3/2015 | Martin | ................... | H04W 4/50 |
| | | | | 701/2 |
| 2015/0081175 A1* | 3/2015 | Fear | ........................ | H04W 4/48 |
| | | | | 701/49 |
| 2015/0197205 A1* | 7/2015 | Xiong | ................... | B60R 16/037 |
| | | | | 701/49 |
| 2015/0314792 A1* | 11/2015 | Kalhous | ............. | G06K 9/00617 |
| | | | | 701/1 |
| 2015/0343993 A1* | 12/2015 | Ferrieres | ................. | B60R 25/04 |
| | | | | 701/2 |
| 2016/0046294 A1* | 2/2016 | Lee | .......................... | G06F 3/016 |
| | | | | 340/576 |
| 2016/0291854 A1* | 10/2016 | Addati | .................... | H04L 67/36 |
| 2017/0116804 A1* | 4/2017 | Bae | ..................... | G07C 9/00563 |
| 2017/0294117 A1* | 10/2017 | Burke | ................ | G06K 9/00791 |
| 2018/0111628 A1* | 4/2018 | Tamagaki | ............. | B60W 30/16 |
| 2018/0266834 A1* | 9/2018 | Cronin | ................ | H04M 1/6091 |
| 2018/0322350 A1* | 11/2018 | D'Addetta | ......... | G06K 9/00832 |
| 2019/0322231 A1* | 10/2019 | Moller | .................. | B60R 16/037 |

FOREIGN PATENT DOCUMENTS

| | | |
|---|---|---|
| DE | 102013201959 A1 | 8/2014 |
| DE | 102015113262 A1 | 2/2016 |
| DE | 102015114684 A1 | 3/2016 |
| DE | 102014016532 A1 | 5/2016 |
| WO | WO-2005/047062 A1 | 5/2005 |
| WO | WO-2016/070960 A1 | 5/2016 |

OTHER PUBLICATIONS

International Preliminary Report on Patentability directed to related International Patent Application No. PCT/EP2017/080820, completed Mar. 11, 2019, with attached English-language translation; 11 pages.

* cited by examiner

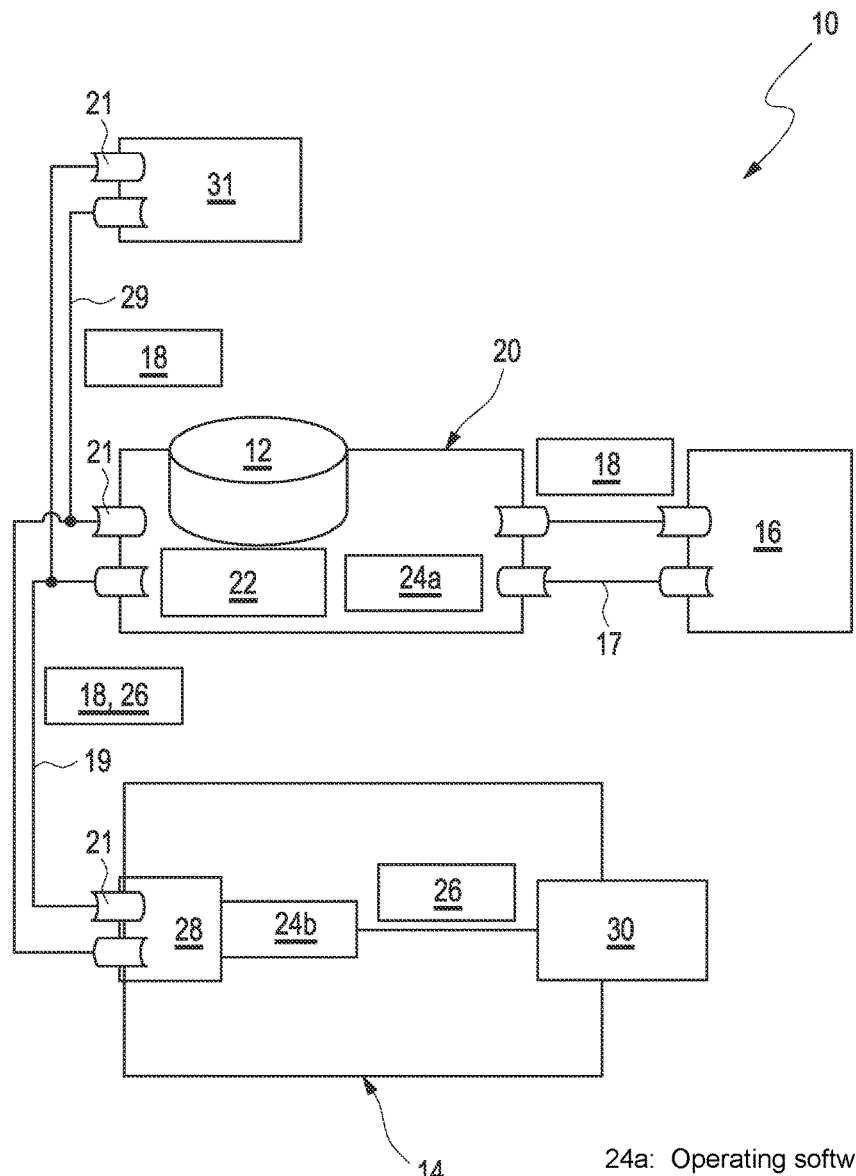
| | |
|---|---|
| 12: Storage unit | 24a: Operating software |
| 14: Vehicle | 24b: Operating software |
| 16: External input unit | 26: Fleet mode |
| 17: Communication means | 28: Control unit |
| 18: Configurations | 29: Communication means |
| 19: Communication means | 30: Vehicle modules |
| 20: Vehicle-external administration device | 31: Vehicle modules |
| 21: Interface | |
| 22: User administration | |

US 11,014,515 B2

METHOD FOR CONFIGURING A VEHICLE

TECHNICAL FIELD

The invention relates to a method for configuring a vehicle. Furthermore, the invention relates to a corresponding vehicle which is designed to implement the method according to the invention.

BACKGROUND

Today's new cars, i.e., newly produced vehicles, are usually designed individually for an end customer. Usually, the end customer is also the proprietor and owner of the vehicle. This means that each end customer selects the vehicle features according to his or her wishes. If the selected vehicle features only relate to settings of parts installed in the vehicle, the so-called hardware, they can usually be set via software. Existing services in the vehicle are subsequently activated or deactivated via the software. Among other things, this also applies to safety-critical functions, such as the configuration of a vehicle access or the connection of a user account to a vehicle. For example, vehicle settings, such as an orientation of the rearview mirrors, seating position and the like, can also be loaded via the user account.

However, the same software is also available in a vehicle that is available to multiple users, such as in fleet vehicles of traditional vehicle rental companies or so-called car-sharing companies that provide a fleet of vehicles for use by multiple users. Such a user is only a short-time owner and user of the vehicle, namely during the agreed rental period.

Possibilities are known from the prior art to influence the configuration of a vehicle for a user.

From DE 10 2015 114 684 A1, a vehicle total reset is known. When detecting a new user, settings of a fleet vehicle are supposed to be reset.

From DE 10 2015 113 262 A1, a system for shared vehicles is known. It is supposed to be determined whether the vehicle is within sight of a user device camera. The user device is supposed to be provided at least with directions to the shared vehicle, and data of the shared vehicle are supposed to be identified. Furthermore, from '262 A1, the configuration of a fleet vehicle on the basis of a user profile, and the blocking of an adjustment of settings of a main user by a second user of the fleet vehicle is known.

From DE 10 2013 015 737 A1, a method for the configuration of a motor vehicle is known. Here, a user profile is to be retrieved from a central computer in order to perform a configuration of settings of a fleet vehicle.

For that purpose, the software is equally available to each user of such a fleet vehicle. With the method known from the prior art, a respective only short-term user can access all setting options offered by the respective vehicle, and thus individually adjust or adapt the settings. As a result, changes and configurations in the vehicle and in vehicle modules are possible by a user who has only temporary vehicle access. Such changes may sometimes not be intentional or pose a security risk. Furthermore, it is disadvantageous that changes or availabilities of software or settings are not communicated to the vehicle, since shutdowns of services partly relate to entire country identifications and the fleet use of the vehicle is not known to the system.

BRIEF DESCRIPTION OF THE DRAWINGS/FIGURES

FIG. 1 illustrates a diagram a method, according to some embodiments of this disclosure.

DETAILED DESCRIPTION

The present invention therefore addresses the problem of addressing at least one of the problems mentioned. In particular, a solution is supposed to be proposed that restricts access to security-critical settings or addresses data protection requirements. When compared to previous solutions, at least an alternative is supposed to be proposed.

According to the invention, a method for configuring a vehicle according to the independent claims is proposed. Furthermore, according to the invention, a vehicle according to the independent claims is proposed. Further respective embodiments can be derived from the dependent patent claims and the description.

According to the method of the invention for configuring a vehicle which is provided for a plurality of users, user data, wherein the data of a respective user are gathered in a user account, and available vehicle features of the vehicle are stored in a storage unit. In this context and in the further disclosure of the present application, a user does not only refer to a single user, but a user also comprises an administrator of user accounts or an administrator of vehicle fleets. Within the scope of the present disclosure, the term storage unit refers, for example, to databases or comparable storage media. The advantage of storing the data in a storage unit, such as a database or a comparable medium, is that the storage unit can be managed centrally. As a result, a general administration, which can be accessed and the contents of which can be linked together, can be created for a plurality of users and for a plurality of vehicles. Therefore, the user no longer has to store his or her data in every vehicle used by the user; instead, a vehicle can access the user data via the administration.

Furthermore, the method according to the invention comprises the steps: Defining vehicle groups according to the association of a respective user account to be assigned to the vehicle with a respective user group, and defining a configuration by assigning respective availabilities of vehicle features of the vehicle for a user of a respective vehicle group. As a result, it is advantageously possible to assign the vehicle to at least one, possibly a plurality of vehicle groups. A vehicle group is thereby defined by the user accounts to be assigned, wherein a vehicle group can comprise a plurality of vehicles of a vehicle fleet. A vehicle group could comprise company vehicles of companies that maintain a pool or fleet of vehicles for employees. A further vehicle group could comprise vehicles of end customers who only use their vehicle privately by several family members. In addition, it is advantageous that different vehicle groups can be assigned to a vehicle, namely depending on the respective user of the vehicle. Thus, a specific availability of functions and services in the vehicle can be defined for each vehicle group. In this manner, specific safety-critical functions that a user is not supposed to access can be deactivated for the user, and so they do not appear to be available in the vehicle. The respective vehicles are automatically assigned to a vehicle group by the assignment of a respective vehicle to a user account of a fleet administrator. Furthermore, an assignment to preconfigured subgroups is possible.

A further step of the method provides that the configuration is stored in the storage unit. As a result, the configuration is repeatedly retrievable. In this manner, a plurality of configurations can be stored in the storage unit.

An embodiment of the method provides that the vehicle is assigned to a user account. Due to the assignment to a user account, group-specific data and features can be transferred to vehicles in a consolidated manner.

A development of the method is characterized in that a configuration corresponding to the vehicle group is assigned to the vehicle on the basis of the user account assigned to the vehicle. Advantageously, an availability of services can thus be preconfigured for each vehicle group. The availability of the services depends on the vehicle group. The vehicle thus advantageously not only has a configuration that is installed and set during the production in a factory but can be configured and assigned to be user-specific or group-specific and vehicle group-specific. Examples of vehicle-specific services include vehicle access, the transmission of telematics data, or the suppression of functions in the user interface of the vehicle. Further services can be, e.g., a logbook, an eco-driving assistant, a driver registration, or a driving efficiency report. A user account thus contains the respective personal data of the user and the user group, to which the user belongs. Specific vehicle groups are defined for the respective user groups. A vehicle group can be provided for one or more user groups. If a user is entered for a vehicle or a user is assigned to the vehicle, the vehicle is also assigned to a vehicle group that corresponds to the vehicle group that is provided for the respective user group of the user. The configuration of the vehicle is thus not predetermined but changes according to the user assigned to the vehicle.

A further embodiment of the method is characterized in that the definition of the configuration of the vehicle is input via an external input unit. As a result, the configuration does not have to be performed by the user in the vehicle, but can be created at any time, e.g. before the vehicle is provided. In order to define the configuration, the input unit does not have to be connected to the vehicle.

A development of the method proposes that the configuration of the vehicle is implemented by a control unit in the vehicle. In this manner, it is ensured that the implementation is executed by means of a set of rules that is implemented by a control unit. A faulty implementation of the configuration can thus be avoided.

The method is developed by activating, deactivating, or changing vehicle features for the user in accordance with the configuration. Thus, specific services can advantageously be made available or unavailable or changed for each user or for each vehicle group. Functions and setting options can thus be switched on or switched off or changed for corresponding users or user groups. This can prevent unauthorized users from making changes that are unwanted or affect safety-critical functions.

A development of the method provides that the configuration is transmitted via standard interfaces to the control unit in the vehicle and/or to vehicle modules. As a result, the vehicle can be accessed via generally available communication means, and data can be transmitted. Access to the vehicle is thus considerably simplified.

A further embodiment is characterized in that the vehicle modules, which each can adjust at least one vehicle feature, access at least one operating software. The operating software allows for a direct communication of the vehicle modules that implement the configuration. Each vehicle module can thus directly implement the configuration specified by the system. According to the configuration, vehicle modules, which can adjust vehicle features, are subsequently activated or deactivated for the user. As a result, only those display and/or operating elements that are available to the user according to the configuration become visible to the user. This simplifies the operation of the settings and the displays for the respective user and increases the clarity. For example, on a display displaying various available setting options, respective displays that are not available can be hidden. Operating elements can thus also be deactivated and hidden or replaced by elements available for the respective configuration. For each vehicle group or for each user, a display or operating elements can be generated according to the configuration.

A still further embodiment of the method is characterized in that transmission mechanisms are defined by the configuration. Transmission mechanisms are required, among other things, for the transmission of data that support one of the fleet-specific services. Among other things, this can be used to configure, when telematics data are transmitted. Among others, transmission mechanisms can be time-based or event-based, i.e., take place at a specific time or at an occurring event. For example, one example hereto is that of preventing the transmission of the GPS position in case of a customer booking but activating the transmission in case of theft.

In addition, a vehicle is proposed, having a control unit which is provided for a plurality of users. The control unit is designed to receive a configuration of the vehicle, wherein the configuration comprises availabilities of vehicle features of the vehicle for a vehicle group, wherein the vehicle group is defined on the basis of a user to be assigned to the vehicle. Such a vehicle can advantageously be configured individually for a vehicle group. The availabilities include services and functions of the vehicle that are activated or deactivated for a vehicle group, i.e., are available or are not available. Thus, for one vehicle group, respective services and functions can be available that are not available for another vehicle group.

An embodiment of the vehicle is characterized in that the control unit is designed to activate or deactivate or change vehicle features in accordance with the configuration. Advantageously, the configuration is thereby implemented solely in the vehicle, thus avoiding errors.

A further embodiment of the vehicle is characterized in that the vehicle modules, which control a vehicle feature, are designed to communicate with the control unit and to activate or deactivate or change the respective vehicle feature according to the configuration.

Further advantages and embodiments of the invention can be found in the description and the attached drawing. The invention is depicted schematically by means of embodiments in the drawing and shall be described schematically and in detail with reference to the accompanying drawing.

FIG. 1 shows a diagram of an embodiment of the method according to the invention.

The diagram 10 shown in FIG. 1 shows one option of a sequence of the method. Initially, user data are stored in a storage unit 12. The storage unit 12 can be a database or a comparable storage medium. User data can include a name, address, size, weight, preferences, and other information of a user. The user data are combined in a user account which is stored and recorded in the storage unit 12. At this point, it must be noted again that a user does not exclusively refer to the respective individual user of a vehicle, but also refers to an administrator of user accounts and/or an administrator of vehicle fleets.

Furthermore, vehicle data of a plurality of vehicles are stored in the storage unit 12. The vehicle data comprise functions, services, features available in the vehicle, as well as basic data such as vehicle type, motorization, and other hardware properties. A vehicle involved in the method is denoted with 14.

The user data and the vehicle data can be input via an external input unit 16. Vehicle groups can also be defined via the external input unit 16. Furthermore, subgroups can also be defined. A vehicle group is defined on the basis of user accounts to be assigned. The user accounts to be assigned in the later course of the method thus represent different user groups. The vehicle 14 is thus assigned to at least one vehicle group on the basis of the user. For that purpose, a user belongs to a corresponding user group. The association with a respective user group is likewise stored in the storage unit 12. User groups can, for example, be private individuals, family members, customers of a vehicle rental company, employees of a company, workshop or maintenance personnel, etc. If a user is assigned to a vehicle, a configuration that corresponds to a respective vehicle group that is provided for the respective user group, to which the user belongs on the basis of his user account, is simultaneously assigned to the vehicle.

Configurations 18 are input and defined via the external input unit 16. The definition is made by determining availabilities for the respective vehicle groups. The availabilities indicate which services and/or functions are to be available to the user of the vehicle group. In the configurations 18, availabilities of services, transmission mechanisms, user profiles, fleet associations, and displays can be defined. The configurations 18 are also stored in the storage unit 12. For example, user interfaces of work computers of rental companies come into consideration as external input unit 16. The external input unit 16 is connected via communication means 17 to a vehicle-external administration device 20. The defined configurations 18 are transferred via the communication means 17 to the administration device 20 and stored in the storage unit 12.

Availabilities of the vehicle 14 for the respective user, who belongs to a respective user group, are thus defined for the respective user groups. Users of the exemplary user group "maintenance mechanic" can, e.g., access all functions and settings of the vehicle to maintain the vehicle in its entirety or to check the respective functions for correctness after maintenance. By contrast, users of the exemplary user group "young family member" can only access a limited availability of functions. For example, members of the user group "young family member" are prevented from activating a sports mode or deactivating supportive aids of the vehicle. These availabilities would then be deactivated and/or hidden on the operating elements. The vehicle assigned to the user groups of the user to be assigned is assigned to a vehicle group via the assignment of the users to the vehicle. According to the vehicle group, the respective configuration is subsequently transmitted to the vehicle 14.

The storage unit 12 is administrated in the vehicle-external administration device 20. The vehicle-external device 20 also comprises a user administration 22 and a corresponding operating software 24a. The operating software 24a is configured such that it is partially executed in the vehicle-external administration device 20 and a complementary part of the operating software 24b is executed in the vehicle 14, and so the vehicle-external administration device 20 and the vehicle can communicate therewith. The operating software 24 thus has a vehicle-external part 24a and a vehicle-internal part 24b which communicate with each other. The operating software 24a, 24b is thus used to communicate the exchange of the configuration information.

The user administration 22 is configured to access the storage unit 12. The user administration 22 is thus also designed to link a user or a user account to a vehicle 14.

Via an association of a user account with a vehicle 14, the vehicle 14 is automatically assigned the configuration 18 which corresponds to the vehicle group provided for the user account on the basis of the respective user group. A configuration 18 for a vehicle group can communicate a so-called fleet mode 26 to the vehicle 14. In such a fleet mode 26, for example, specific safety-critical functions and services can be deactivated and are thus not available to the user in the vehicle 14. For example, a specific type of access to the vehicle 14 could be unavailable and therefore not selectable for the user in the display and operating elements. The fleet mode 26 is preferably transmitted to vehicles 14 that belong to a vehicle group that comprises a vehicle fleet, e.g., of a company.

Communication with the vehicle 14 takes place via communication means 19 which transmit data between standard interfaces 21. Such a communication means 19 is, for example, a wireless data transmission. Alternatively, it is provided that a communication with the control unit 28 is achieved via a wired connection. The communication is supported by the operating software 24a, 24b.

When the configuration 18 is communicated to the vehicle, the configuration 18 is implemented by a control unit 28 in the vehicle 14. The operating software 24b present in the control unit 28 executes the configuration 18 and activates or deactivates the corresponding services or functions and transmits the fleet mode 26 to the respective vehicle modules 30. A vehicle module 30 is a display or operating element. The services available according to the configuration are now visible on the display or operating element 30. Further vehicle modules 30 can be, e.g., an infotainment module, a locking system control unit, or an interface control unit for a telephone or a near field communication (NFC). The vehicle module 30 is at least configured to accept inputs for entering data.

Via communication means 29 in the vehicle 14, further vehicle modules 31 can access the storage unit 12 and receive the corresponding configuration. Further vehicle modules 31 can be, e.g., mobile phones, tablets or other computers, or other devices, into which data can be entered. The vehicle modules 30, 31 are configured to process data for the configuration and/or data for creating a user profile, wherein processing refers to any conventional form of data processing, such as reception, storage, copying, and the like. In the further vehicle modules 31, the corresponding configuration is implemented and the corresponding service or the corresponding function is activated or deactivated or changed, i.e., the availability is configured. If, for example, a user profile is created via the vehicle module 31, the created user profile is stored in the vehicle-external administration device 20. The profile of the communication between the administration device 20 and the vehicle 14 is subsequently defined via the user profile or the vehicle-external administration device 20.

In addition, it is provided that a vehicle module 30, 31 communicates centrally with the operating software 24b via the operating software 24a. This streamlines the processes and centralizes the communication.

The invention claimed is:

1. A method for configuring a vehicle for a user, wherein the vehicle is provided for a plurality of users, the method comprising:
storing user data and vehicle features of the vehicle in a storage unit, wherein the user data are gathered in a user account;
defining a configuration for the vehicle;
storing the configuration in the storage unit; and
transmitting the configuration to the vehicle,
wherein the user data comprise an association with a user group, the user group being linked to a vehicle group, for which a specific availability of functions and services in the vehicle is defined,
wherein the defining the configuration includes assigning the vehicle features of the vehicle, which are defined in the vehicle group, with the user group,
wherein the transmitting the configuration to the vehicle in accordance with the configuration includes activating, deactivating, or changing the vehicle features for the user, and
wherein vehicle modules, which each is configured to adjust the vehicle features, are activated or deactivated for the user, making visible for the user only those display or operating elements that are available for the user according to the configuration such that display or operating elements that are not available for the user are hidden.

2. The method according to claim 1, wherein the vehicle features comprise services, functions, and setting options associated with the vehicle.

3. The method according to claim 1, further comprising:
receiving, using an external input unit, which is not located in the vehicle and is not connected to the vehicle, the definition of the configuration.

4. The method according to claim 3, wherein the configuration is implemented by a control unit in the vehicle.

5. The method according to claim 4, wherein the configuration is transmitted via standard interfaces to the control unit in the vehicle or to the vehicle modules.

6. The method according to claim 5, wherein the vehicle modules, which each are configured to adjust at least one of the vehicle features, access at least one operating software.

7. The method according to claim 1, wherein transmission mechanisms for transmitting the configuration are defined by the configuration.

8. A vehicle provided for a plurality of users, the vehicle comprising:
a control unit configured to receive a configuration of the vehicle for a user to be assigned to the vehicle,
wherein the configuration comprises availabilities of vehicle features of the vehicle for a vehicle group,
wherein the vehicle group is defined based on the user or user account to be assigned to the vehicle,
wherein the control unit is configured to activate, deactivate, or change the vehicle features according to the configuration using vehicle modules that are configured to control a vehicle feature, and
wherein the vehicle modules are configured to communicate with the control unit and are configured to activate, deactivate, or change the respective vehicle feature according to the configuration, and are configured to make visible only those display or operating elements that are available for the user according to the configuration such that display or operating elements that are not available for the user are hidden.

9. The vehicle according to claim 8, wherein the vehicle features comprise services, functions, and setting options associated with the vehicle.

10. The vehicle according to claim 8, wherein data is transmitted in accordance with a transmission mechanism defined by the configuration.

11. The vehicle according to claim 8, wherein the control unit is configured to receive, using an external input unit, which is not located in the vehicle and is not connected to the vehicle, the configuration.

12. The vehicle according to claim 11, wherein the configuration is transmitted via standard interfaces to the control unit in the vehicle or to the vehicle modules.

13. The vehicle according to claim 12, wherein the vehicle modules are configured to access at least one operating software.

* * * * *